United States Patent [19]

Mao

[11] 4,124,572
[45] Nov. 7, 1978

[54] THERMOPLASTIC POLYURETHANE ELASTOMER

[75] Inventor: Chung-Ling Mao, Sandy Hook, Conn.

[73] Assignee: Uniroyal, Inc., New York, N.Y.

[21] Appl. No.: 813,070

[22] Filed: Jul. 5, 1977

[51] Int. Cl.² .................. C08G 18/42; C08G 18/48
[52] U.S. Cl. .................................. 528/76; 528/80
[58] Field of Search .................. 260/75 NP, 77.5 AN

[56] References Cited

U.S. PATENT DOCUMENTS

| | | | |
|---|---|---|---|
| 3,666,724 | 5/1972 | Hostettler | 260/77.5 AN |
| 3,684,770 | 8/1972 | Meisert et al. | 260/75 NP |
| 3,915,937 | 10/1975 | O'Shea | 260/77.5 AM |
| 3,983,094 | 9/1976 | O'Shea | 260/77.5 AM |
| 4,051,111 | 9/1977 | Holloway | 260/75 NP |

*Primary Examiner*—H.S. Cockeram
*Attorney, Agent, or Firm*—James J. Long

[57] ABSTRACT

Thermoplastic polyurethanes prepared from a reaction mixture comprising:
(a) a poly(oxypropylene)-poly(oxyethylene) glycol of molecular weight from 1000 to about 3000 containing 25-60% by weight oxyethylene groups;
(b) a polyester polyol of molecular weight from 1000 to about 3000;
(c) a polyisocyanate; and
(d) a low molecular weight polyol chain extender.

The elastomers are useful in automotive product applications, cattle ear tags, coatings and coated fabrics.

5 Claims, No Drawings

THERMOPLASTIC POLYURETHANE ELASTOMER

This invention relates to thermoplastic polyurethane elastomers and shaped articles made therefrom.

More particularly the invention relates to thermoplastic polyurethanes which are useful in (1) automotive product applications, (2) cattle ear tags, (3) coatings, (4) coated fabrics and the like. These thermoplastic polyurethanes are made from a reaction mixture comprising (a) a poly(oxypropylene)-poly(oxyethylene) glycol of molecular weight from 1000 to about 3000 containing 25–60% by weight oxyethylene groups; (b) a polyester polyol of molecular weight from 1000 to about 3000; (c) a polyisocyanate; and (d) a low molecular weight polyol chain extender.

U.S. Pat. No. 3,915,937, O'Shea, Oct. 28, 1975, describes a poly(oxypropylene) glycol based elastomer suitable for automobile flexible exterior body parts. Such a material can be prepared from a polyol of approximately 1750 to 2500 molecular weight, methylene-bis(4-phenylisocyanate) and 1,4-butanediol, the molar ratio of butanediol to polyol being about 3.0:1 to 9.0:1. That patent is based on the fact that it was most unexpected to be able to make hard elastomers with the necessary high and low temperature properties from poly(oxypropylene) glycol.

U.S. Pat. No. 3,983,094, O'Shea, Sept. 28, 1976, discloses that elastomers based on poly(oxypropylene)-poly(oxyethylene) glycols of oxyethylene group content 15% or more possess significantly better thermal stability than those based on polyols containing 10% or less oxyethylene group content. Particularly preferred were polyols containing 30% or more oxyethylene group content. It was found that this improvement in thermal stability could be achieved with no sacrifice in the properties essential to automobile flexible body part use. In fact, slightly better strength properties appeared to result from the use of polyols with higher ethylene oxide content. In contrast, the present products are based on polyester in addition to polyether and embody an unexpected improvement in physical properties (particularly tensile strength) in addition to exhibiting significantly improved moldability and paintability. The present products based on blends of polyester and polyether unexpectedly have tensile strength properties approaching those of polyester-based products, and indeed the present polyester-polyether based products are capable of tensile strength properties actually higher than those of the purely polyester-based product, which is a very surprising synergistic effect and totally unexpected, as will be demonstrated in working examples hereinbelow.

A copending application, Ser. No. 661,595 of O'Shea et al., filed Feb. 26, 1976, now U.S. Pat. No. 4,041,105, discloses a polyurethane elastomer prepared from a reaction mixture comprising (a) a "graft" polyol prepared by the in situ polymerization of one or more ethylenically unsaturated monomers in a poly(oxypropylene)-poly(oxyethylene) glycol of molecular weight from about 1750 to about 4000 and containing from 15 to 50% oxyethylene groups by weight, (b) methylenebis(4-phenylisocyanate), and (c) 1,4-butanediol.

A copending application, Ser. No. 661,212 of Mao et al., filed Feb. 25, 1976, now U.S. Pat. No. 4,049,636, discloses a polyurethane elastomer prepared from a reaction mixture comprising (a) a poly(oxypropylene)-poly(oxyethylene) glycol of molecular weight from about 1500 to about 4000 and containing 15% to 50% oxyethylene group content by weight; (b) a "graft" polyol of molecular weight from about 2500 to about 4500 prepared by the in situ polymerization of one or more ethylenically unsaturated monomers in a poly(oxypropylene) and/or poly(oxypropylene)-poly(oxyethylene) glycol containing less than 15% by weight oxyethylene groups; (c) methylenebis(4-phenylisocyanate); and (d) 1,4-butanediol.

The present invention is based on the unexpected discovery that a thermoplastic polyurethane elastomer having a remarkable combination of desirable properties may be prepared from a reaction mixture comprising:

(a) a poly(oxypropylene)-poly(oxyethylene) glycol of molecular weight from 1000 to about 3000 containing 25–60% by weight oxyethylene groups;

(b) a polyester polyol of molecular weight from 1000 to about 3000;

(c) a polyisocyanate; and (d) a low molecular weight polyol chain extender.

The polyurethanes made from above ingredients possess a unique combination of properties such as excellent high tensile strength, high tear resistance, high elongation, excellent thermal properties (high and low temperatures), outstanding processability, good moldability and paintability, and can be molded into many complex articles.

Polyurethane thermoplastics of this invention may be prepared utilizing either prepolymer or one-shot (masterbatch) technique. The prepolymer is formed by reacting organic polyhydroxyl material which is a mixture of poly(oxypropylene)-poly(oxyethylene) glycol and a polyester polyol with a polyisocyanate to form an isocyanate terminated prepolymer. The prepolymer is then treated with an equivalent amount of a low molecular weight polyol chain extender and heated at elevated temperatures to effect a "cure." The one-shot or masterbatch system is effected by mixing the polyhydroxyl compounds, chain extender and polyisocyanate together simultaneously at moderate temperatures, followed by curing at elevated temperatures. The one-shot technique is preferred in carrying out the invention.

The poly(oxypropylene)-poly(oxyethylene) glycol (a) used in the invention may be either a "tipped" polyol in which a poly(oxypropylene) glycol is reacted further with ethylene oxide giving rise to oxyethylene group blocks on each end of the polyol or a more random poly(oxypropylene)-poly(oxyethylene) glycol in which the propylene oxide and ethylene oxide reactants are introduced together or in alternating portions. The preparation of both types of polyol is described in "Polyurethanes: Chemistry and Technology," Part 1. Chemistry, by J. H. Saunders and K. C. Frisch, Interscience, New York, 1962, pp. 36–37. The technique of tipping is further described in "Advances in Urethane Science and Technology" by K. C. Frisch and S. L. Reegan, Technomic Publishing Company, Westport, Conn. 1973, pp. 188–193.

The oxyethylene group content of the polyol (a) may range from 25–60%, with the higher levels being preferred for the higher molecular weight polyols. For a 2000 molecular weight polyol the preferred oxyethylene group content is 30–50%, with the higher levels being preferred for the higher molecular weight polyols. The poly(oxypropylene)-poly(oxyethylene) glycol (a) employed has, as indicated, a molecular weight of from about 1000 to about 3000.

The polyester types of polyols used in making polyurethanes are likewise well known in the art and require no detailed description here. It will be understood that they include chain extended polyesters made from a glycol (e.g., ethylene and/or propylene glycol) and a saturated dicarboxylic acid (e.g., adipic acid as well as polycaprolactonediols). By way of non-limiting example there may be mentioned poly(ethylene adipate) glycol, poly(propylene adipate) glycol, poly(butylene adipate) glycol, poly(neopentyl sebacate) glycol, etc. Small amounts of trialcohols such as trimethylolpropane or trimethylolethane may be included in the polyester preparation. Polyester polyols with functionalities of three or more (e.g., glycerides of 12-hydroxystearic acid) are also useful. Suitable polyester polyols include those obtainable by reacting such polyols as 1,4-butanediol, hydroquinone bis(2-hydroxyethyl)ether, ethylene glycol, diethylene glycol, triethylene glycol, propylene glycol, dipropylene glycol, 2-methyl-2-ethyl-1,3 propanediol, 2-ethyl-1,3-hexanediol, 1,5-pentanediol, thiodiglycol, 1,3-propanediol, 1,3-butanediol, 2,3-butanediol, neopentyl glycol, 1,2-dimethyl-1,2-cyclopentanediol, 1,2-cyclohexanediol, 1,2-dimethyl-1,2-cyclohexanediol, glycerol, trimethylol propane, trimethylol ethane, 1,2,4-butanetriol, 1,2,6-hexanetriol, pentaerythritol, dipentaerythritol, tripentaerythritol, anhydroaneaheptitol, mannitol, sorbitol, methyl-glucoside, and the like with such dicarboxylic acids as adipic acid, succinic acid, glutaric acid, azelaic acid, sebacic acid, malonic acid, maleic acid, fumaric acid, phthalic acid, isophthalic acid, terephthalic acid, tetrachlotophthalic acid and chlorendic acid; the acid anhydrides and acid halides of these acids may also be used. The polyester has a molecular weight of about 1000 to about 3000, preferably about 2000.

Polyisocyanates suitable for use in the invention are the aromatic diisocyanates 2,4-tolylene diisocyanate and methylenebis(4-phenylisocyanate) and the aliphatic diisocyanates 4,4'-diisocyanatodicyclohexylmethane and isophorone diisocyanate.

The chain extenders are typically diamines or diols. Typical diols which may be used are listed, for example, in U.S. Pat. Nos. 3,233,025 (col. 4, lines 20-26), 3,620,905 (col. 2, lines 53-59) and 3,718,622 (col. 2, lines 10-18).

The ratio of (a) poly(oxypropylene)-poly(oxyethylene) glycol to (b) polyester polyol employed in the invention will range from about 10/90 to 90/10 by weight, with a preferred ratio of from about 80/20 to 40/60.

The molar ratio of chain extender (d) to polyol (a) plus (b) which may be used depends on the use of the polyol and is usually from 3 to 1 to 10 to 1. The NCO/OH ratio used to prepare the flexible thermoplastics may range from 0.95 to 1.10 with 1.00 to 1.05 being preferred.

A catalyst may or may not be used as desired. Some examples of useful catalysts are N-methyl-morpholine, N-ethyl-morpholine, triethyl amine, triethylene diamine (Dabco), N,N'-bis(2-hydroxylpropyl)-2-methyl piperazine, dimethyl ethanol amine tertiary amino alcohols, tertiary ester amines, stannous octoate, dibutyl tin dilaurate and the like.

Flexible polyurethane thermoplastics based on poly(oxypropylene)-poly(oxyethylene) glycol alone possess good physical properties as well as good thermal stability. However, this type of urethane is somewhat deficient in areas of processability and moldability. In particular, these polyurethanes possess a relatively low modulus and thus are difficult to release when they are injection molded into large complex articles.

The flexible polyurethane thermoplastics of this invention made from blends of (a) poly(oxypropylene)-poly(oxyethylene) glycol and (b) polyester diol exhibit a surprisingly unique combination of properties, such as, excellent tensile strength, high tear resistance, high elongation, good high temperature stability and low temperature flexibility, high resiliency, excellent processability, good moldability and paintability and the raw materials are low in cost. Flexible polyurethane thermoplastics of this invention may be smoothly processed and may easily be molded into large complex articles.

The hardness of the elastomers of the invention ranges from relatively softer products of about 80–90 Shore A, suitable for ear tags, coatings, etc., to relatively harder products of about 40 to 55 Shore D, suitable for automotive use. (Hardness values are measured as Shore D when values above 90 are obtained using the Shore A scale; measurements are expressed as Shore A when values less than 20 are obtained with the D scale.)

For coatings and coated fabrics the molecular weight of the polyol usually varies from 1000 to 2000 as moldability and thermal stability are not requirements.

Elastomers of the invention suitable for automotive use have an elongation of greater than 300%, an ultimate tensile strength of at least 4,000 psi and a Die C tear strength of at least 500 pli. (as well as a hardness of 40 to 55 Shore D). For ear tags, coatings, etc., a hardness of 80–90 Shore A is suitable while the other properties may be as specified for automotive applications, although the tensile and tear strength are less critical.

EXAMPLE 1

Elastomer A

A mixture of 210 parts of a 2000 molecular weight poly(oxypropylene)-poly(oxyethylene) glycol containing 45% by weight of ethylene oxide (obtained from Olin Corp.)(EO-PPG) and 90 parts of a 2000 molecular weight polycaprolactonediol (PCL)(obtained from Union Carbide Corp.) is dried at 100° C. under vacuum (~3 mmHg) for 1 hour. The polyol mixture is then heated at 130° C. and 68 parts of 1,4-butanediol (chain extender) is added with stirring.

To 355 parts of the polyol mixture at 130° C. is added 223 parts of 4,4'-methylenebis(phenylisocyanate) (MDI). The reaction mixture is well mixed for 20 to 40 seconds and poured into a 12 × 12 × 0.5 inch open mold and cured at 163° C. for 20 minutes.

The ratio of equivalents of polyol mixture/chain extender/diisocyanate in the final polymer is 1/5/6.

The resultant polymer is then diced, dried for 2 hours at 110° C. and injection molded into 3 × 4 × 0.08 inch plaques, using ½ oz. Newbury (trademark) injection molding machine at a barrel and nozzle temperature of 200° C. to 210° C.

Elastomers B through G are prepared as described in the preparation of Elastomer A with various mixtures. Elastomers H and I are similarly prepared based on the polyol mixtures of a random poly(oxypropylene)-poly(oxyethylene) glycol (2000 molecular weight; 45:65 weight ratio of oxyethylene to oxypropylene) in which the propylene oxide and ethylene oxide reactants are introduced together (R-PPG) and the polycaprolactonediol. Physical properties of these polymers are summarized in Table 1, wherein "−20° F. Impact" and "Heat Sag Test" are as described in U.S. Pat. No. 3,983,094 of O'Shea referred to above (col. 4, lines 11-54).

For purposes of comparison there are included in Table I two elastomers, J and K, which are outside the invention. Elastomer J is based solely on the polyether glycol used in Elastomers A-G while Elastomer K is based solely on the polyester glycol used in Elastomers A-G. As is known, polyester based polyurethanes possess excellent tensile strength while ethylene oxide-polypropylene glycol based materials are significantly poorer in tensile strength properties. However, when the two materials are blended together in accordance with the invention in varying ratios the tensile strength properties approach those of a 100% polyester based material; in fact, in a 50/50 blend the tensile strength properties are 10% higher than the 100% polyester material thus showing a very surprising synergistic effect, which is totally unexpected (compare Elastomer F with Elastomer K).

polymer it was cheesy in nature and no meaningful physical properties could be obtained.

EXAMPLE 2

Elastomer L

A mixture of 360 parts of a 2000 molecular weight polycaprolactonediol (obtained from Union Carbide Corp.) and 240 parts of a 2000 molecular weight poly(oxypropylene) poly(oxyethylene) glycol containing 45% by weight of ethylene oxide is dried at 100° C. (212° F.) under vacuum (~3 mmHg) for 1 hour. Ninety-six and one-half parts of 1,4-butanediol is then added.

To 700 parts of the polyol mixture at 145° C. is added 338 parts of 4,4'-methylenebis(phenylisocyanate). The mixture is well mixed for 30 seconds to 1.0 minute and poured into a 12 × 12 × 0.5 inch open mold and cured at 163° C. (325° F.) for 1 hour.

The ratio of equivalents of polyol mixture/chain extender/dissocyanate in the final polymer is 1/3.5/4.5.

The physical properties of this polymer are summarized below, both before and after aging 500 hours in weatherometer tests, and compared with a commercially available polyurethane material, based on polyca- Table I

| | Elastomers Prepared at Various Ratios | | | | | | | | | | |
|---|---|---|---|---|---|---|---|---|---|---|---|
| | A | B | C | D | E | F | G | H | I | J | K |
| EO-PPG/PCL | 70/30 | 70/30 | 80/20 | 90/10 | 50/50 | 50/50 | 40/60 | — | — | 100/0 | 0/100 |
| R-PPG/PCL | — | — | — | — | — | — | — | 50/50 | 67/33 | — | — |
| MDI/Polyol Ratio | 6.0 | 4.5 | 6.0 | 6.0 | 5.5 | 4.0 | 5.0 | 4.5 | 5.0 | 6.0 | 4.5 |
| Hardness-Shore D | 45 | 40 | 45 | 44 | 43 | 40 | 45 | 40 | 41 | 45 | 40 |
| 100% Modulus, psi | 1275 | 992 | 1304 | 1240 | 1205 | 1043 | 1105 | 1090 | 1309 | 1150 | 900 |
| 300% Modulus, psi | 2351 | 1781 | 2381 | 2204 | 2439 | 1884 | 1954 | 1885 | 2663 | 2270 | 1600 |
| Elongation % | 467 | 490 | 457 | 513 | 470 | 495 | 457 | 485 | 450 | 440 | 510 |
| Tensile, psi | 5492 | 5364 | 4870 | 4759 | 6026 | 5070 | 5356 | 5080 | 5523 | 3720 | 5400 |
| Die C Tear, pli | 624 | 548 | 599 | 586 | 592 | 575 | 525 | 685 | 608 | | |
| −20° F Impact | pass | pass | pass | pass | pass | pass | pass | pass | pass | | |
| Heat Sag Test | pass | pass | pass | pass | pass | pass | pass | pass | pass | | |

The above data show that the elastomers of the invention are suitable for use in automotive applications, particularly with respect to flexible exterior body parts for automobiles including parts associated with energy-absorbing bumper systems, such as, sight shields, fender extensions and full fascia front and rear ends, since the material must be (1) capable of flexing under impact and then returning to its original shape; (2) elastomeric in nature and (3) have strength as typified by high tensile strength and high tear strength.

In contrast to Example I, unsatisfactory results are obtained from a reaction mixture comprising a polypropylene glycol containing no oxyethylene groups, a polyester diol, a polyisocyanate and a low molecular weight polyol chain extender. After pouring such a reaction mixture into an open mold it was found that the resultant polymer could not be injection molded due to poor physical properties — clearly pointing out the importance of having oxyethylene groups present in the PPG polyol in the blend in order to obtain a flexible thermoplastic polyurethane having outstanding physical properties, excellent processability, good moldability, etc. To demonstrate this there is dried under vacuum a mixture of 150 parts of a 2,000 molecular weight PPG and 150 parts of a 2,000 molecular weight polycaprolactonediol. The polyol mixture is then heated at 130° C. and 48.3 parts of 1,4-butanediol is added with stirring. To 320 parts of the polyol mixture at 145° C. is added 165 parts of 4,4'-methylenebis-(phenylisocyanate). The reaction mixture is well mixed for 1 minute and poured into a 12 × 12 × 0.5 inch open mold and cured at 325° F. for 1 hour. The polymer could not be injection molded. Also, on examination of the cured prolactone as the sole macropolyol, marketed by Upjohn Co. under the tradename of Pellethane (trademark) 2102-80A, said commercial material being useful as cattle ear tags and shows that the product of my invention is at least equal to, or better than, the commercial material, but lower in cost.

Table II

| | Weatherometer 500 Hour Aging Tests | | | |
|---|---|---|---|---|
| | L | | Commercial Material | |
| | Unaged | Aged | Unaged | Aged |
| EO-PPG/PCL | 40/60 | | 0/100 | |
| Hardness-Shore A | 87 | 89 | 86 | 88 |
| 100% Modulus, psi | 980 | 1090 | 880 | 1050 |
| 300% Modulus, psi | 1750 | 1850 | 1570 | 1640 |
| Elongation - % | 540 | 520 | 510 | 470 |
| Tensile, psi | 5210 | 5040 | 5360 | 3960 |
| 200% Elongation Set - % | — | 21 | — | 23 |

EXAMPLE 3

In this example, a 2000 molecular weight poly(oxypropylene)-poly(oxyethylene) glycol is mixed with a 1000, 1500 and a 2000 molecular weight polycaprolactonediol (50/50, EO-PPG/PCL) employing the one-shot techniques disclosed in Example 1. The effect of molecular weight change of the PCL on the physical properties of thermoplastic polyurethanes is presented in the table below.

Table III

|  | M | N | O |
|---|---|---|---|
|  | EOPPG/ 1000 PCL | EOPPG/ 1500 PCL | EOPPG/ 2000 PCL |
| MDI/Polyol Ratio | 3.5 | 4.0 | 4.0 |
| Hardness-Shore A | 90 | 90 | 85 |
| 100% Modulus, psi | 1250 | 1043 | 757 |
| 300% Modulus, psi | 2367 | 1884 | 1259 |
| Elongation, % | 443 | 495 | 567 |
| Tensile, psi | 5077 | 5070 | 3698 |
| Die C Tear, pli | 605 | 575 | — |

EXAMPLE 4

A mixture of 180 parts of a 2000 molecular weight poly(oxypropylene)-poly(oxyethylene) glycol containing 45% by weight of ethylene oxide and 180 parts of a 1500 molecular weight polyester diol which is a reaction product of 1,6-hexanediol, adipic acid and isophthalic acid (S-1014-75 [trademark] obtained from Hooker Chemical Co.) is dried at 100° C. under vacuum (~3mmHg) for 1 hour. The polyol is then heated at 130° C. and 56.7 parts of 1,4-butanediol is added with good mixing.

To 400 parts of the polyol mixture at 130° C. is added 207 parts of 4,4'-methylene bis(phenylisocyanate). The reaction mixture is mixed for 20 seconds and cured at 165° C. for 1 hour.

The ratio of equivalents of polyol mixture/chain extender/diisocyanate in the final polymer is 1/3/4.

The physical properties of the polymer are presented in the table below, — said polymer finding use in coating applications.

Table IV

| MDI/Polyol Ratio | 4.0 |
|---|---|
| Hardness-Shore A | 88 |
| 100% Modulus | 1091 |
| 300% Modulus | 2255 |
| Elongation % | 470 |
| Tensile | 5008 |
| Die C. Tear | 573 |

What is claimed is:

1. A thermoplastic polyurethane elastomer which is a reaction product of:
    (a) a poly(oxypropylene)-poly(oxyethylene) glycol of molecular weight from 1000 to 3000 containing 25-60% by weight oxyethylene groups;
    (b) a chain extended polyester polyol of molecular weight from 1000 to 3000;
    (c) a polyisocyanate selected from the group consisting of 2,4-tolylene diisocyanate, methylenebis (4-phenylisocyanate), 4,4'-diisocyanatodicyclohexylmethane and isophorone diisocyanate; and
    (d) a low molecular weight polyol chain extender, the ratio of (a) to (b) being from 10/90 to 90/10 by weight, the molar ratio of (d) to (a) plus (b) being from 3:1 to 10:1 and the NCO/OH equivalence ratio being from 0.95:1 to 1.10:1, said elastomer having a hardness of from 80 Shore A to 55 Shore D, an elongation of greater than 300%, an ultimate tensile length of at least 4,000 psi and a Die C tear Strength of at least 500 pli.

2. A thermoplastic polyurethane elastomer as in claim 1 in which the said polyester polyol (b) is selected from the group consisting of polycaprolactone diol and a reaction product of 1,6-hexanediol, adipic acid and isophthalic acid.

3. A thermoplastic polyurethane as in claim 2, having a hardness of 40-55 Shore D.

4. A thermoplastic polyurethane as in claim 2, having a hardness of 80-90 Shore A.

5. A thermoplastic polyurethane elastomer as in claim 2 in which the molecular weight of (a) is 2000 and the oxyethylene group content is 30-50%, (b) is polycaprolactonediol having a molecular weight of 2,000, (c) is methylenebis(4-phenylisocyanate), (d) is 1,4-butanediol, the ratio of (a) to (b) is from 80/20 to 40/60 by weight, and the NCO/OH equivalence ratio is from 1.00:1 to 1.05:1.

* * * * *